United States Patent
Chen

(10) Patent No.: US 9,762,336 B2
(45) Date of Patent: Sep. 12, 2017

(54) CALIBRATION METHOD AND CALIBRATION CIRCUIT

(71) Applicant: ALI CORPORATION, Hsinchu (TW)

(72) Inventor: Yue-Yong Chen, Zhuhai Guangdong (CN)

(73) Assignee: ALI CORPORATION, Hsinchu (TW)

( * ) Notice: Subject to any disclaimer, the term of this patent is extended or adjusted under 35 U.S.C. 154(b) by 0 days.

(21) Appl. No.: 15/298,489

(22) Filed: Oct. 20, 2016

(65) Prior Publication Data

US 2017/0163356 A1  Jun. 8, 2017

(30) Foreign Application Priority Data

Dec. 8, 2015  (CN) .......................... 2015 1 0897006

(51) Int. Cl.
| | |
|---|---|
| H04L 5/12 | (2006.01) |
| H04L 27/38 | (2006.01) |
| H04B 17/21 | (2015.01) |
| H04B 1/16 | (2006.01) |
| H04L 27/152 | (2006.01) |

(52) U.S. Cl.
CPC .............. *H04B 17/21* (2015.01); *H04B 1/16* (2013.01); *H04L 27/1525* (2013.01)

(58) Field of Classification Search
USPC ....... 375/219, 220, 221, 222, 211, 224, 227, 375/229–236, 240.02–240.07, 375/240.26–240.29, 240.12–240.15, 254, 375/259, 284, 285, 278, 271, 261, 260, 375/293, 295, 298, 300, 316, 320, 338, 375/339, 340, 346, 347, 348, 349, 350
See application file for complete search history.

(56) References Cited

U.S. PATENT DOCUMENTS

| | | | | |
|---|---|---|---|---|
| 5,894,249 A | * | 4/1999 | Kuwabara | ................ H03C 3/00 327/254 |
| 5,926,065 A | * | 7/1999 | Wakai | .................... H03D 3/006 329/304 |
| 7,133,657 B2 | * | 11/2006 | Kuenen | ............... H04L 27/3863 375/231 |

(Continued)

OTHER PUBLICATIONS

Fouladifard et al, On Adaptive Cancellation of IQ Mismatch in OFDM Receivers, 2003 IEEE ICASSP 2003, pp. 564-567.*

*Primary Examiner* — Linda Wong
(74) *Attorney, Agent, or Firm* — Li & Cai Intellectual Property (USA) Office

(57) ABSTRACT

Disclosed are a calibration method and a calibration circuit. The calibration method and the calibration circuit effectively calibrate the mismatches between the first signal path and the second signal path of a receiver by calibrating a plurality of tap coefficients of a finite impulse response filter configured in the second signal path and optimizing the tap coefficients. The calibration and optimization for the tap coefficients of the finite impulse response filter is according to differences between the electrical characteristics the analog-to-digital convertor and the LPF in the first signal path and differences between the analog-to-digital convertor and the LPF in the second signal path. These differences are obtained when the data reception has not yet started by the receiver (that is, when the receiver is working in a training mode).

18 Claims, 6 Drawing Sheets

(56) References Cited

U.S. PATENT DOCUMENTS

| | | | |
|---|---|---|---|
| 7,174,146 B2* | 2/2007 | Wu | H04L 27/3863 455/296 |
| 7,956,694 B1* | 6/2011 | Wilson | H03L 7/08 315/194 |
| 8,130,882 B2* | 3/2012 | Elenes | H04B 1/1081 375/229 |
| 8,275,082 B2* | 9/2012 | Kong | H04B 1/7085 375/136 |
| 8,351,495 B2* | 1/2013 | Skeet | H04L 27/38 375/232 |
| 8,615,059 B2* | 12/2013 | Mikhemar | H04L 27/0014 375/346 |
| 8,619,916 B2* | 12/2013 | Jong | H04L 27/3863 375/322 |
| 8,976,914 B2 | 3/2015 | Viswanathan | |
| 9,008,161 B1* | 4/2015 | Chang | H04L 25/03261 375/219 |
| 2003/0007574 A1* | 1/2003 | Li | H04L 27/0014 375/316 |
| 2006/0217069 A1* | 9/2006 | Chen | H04B 1/30 455/63.1 |
| 2007/0080835 A1* | 4/2007 | Maeda | H03D 3/009 341/120 |
| 2007/0204315 A1* | 8/2007 | Park | H04B 1/30 725/100 |
| 2007/0287402 A1* | 12/2007 | Feng | H04B 1/0003 455/323 |
| 2009/0310712 A1* | 12/2009 | Nakatani | H03L 7/099 375/316 |
| 2010/0048157 A1* | 2/2010 | Carrera | G01S 19/32 455/307 |
| 2010/0167680 A1* | 7/2010 | Li | H04B 1/28 455/302 |
| 2010/0184394 A1* | 7/2010 | Suominen | H03D 3/007 455/131 |
| 2011/0019723 A1* | 1/2011 | Lerner | H04B 7/0871 375/219 |
| 2011/0222631 A1* | 9/2011 | Jong | H04L 27/3863 375/316 |
| 2012/0099673 A1* | 4/2012 | Johansson | H04L 27/364 375/296 |
| 2012/0177151 A1* | 7/2012 | Hormis | H04L 27/3863 375/340 |
| 2013/0130638 A1* | 5/2013 | Kaukovuori | H04B 1/16 455/323 |
| 2014/0044158 A1* | 2/2014 | Raghu | H04L 27/3863 375/224 |
| 2014/0119485 A1* | 5/2014 | Seo | H04L 25/08 375/349 |
| 2014/0176364 A1* | 6/2014 | Brauner | H04J 3/02 342/357.76 |
| 2015/0155955 A1* | 6/2015 | Chang | H04L 25/03261 375/226 |
| 2015/0350000 A1* | 12/2015 | Chang | H04L 27/364 375/227 |

* cited by examiner

CALIBRATION METHOD AND CALIBRATION CIRCUIT

BACKGROUND OF THE INVENTION

1. Field of the Invention

The instant disclosure relates to a calibration method and a calibration circuit; in particular, to a calibration method and a calibration circuit that calibrate mismatches between a first signal path and a second signal path of a receiver.

2. Description of Related Art

How to compensate mismatches between an in-phase signal path and a quadrature signal path of the receiver is rather important with regard to receivers used in the current communications field.

There are mainly two reasons why there will be mismatches between the in-phase signal path and the quadrature signal path. One is that, it is hard to have a perfect 90 degrees phase difference between the signal waves that are generated by a local oscillator and respectively input to an in-phase signal path and a quadrature signal path. In another aspect, the amplitudes of the signal waves that are generated by a local oscillator and respectively input to an in-phase signal path and a quadrature signal path are not equal. A phase difference and/or an amplitude difference mentioned above lead to mismatches between the in-phase signal path and the quadrature signal path. Even though the phase difference and/or the amplitude difference are minor, there is still an obvious interference affecting the whole communication system, which causes an abnormal quadrature demodulation and results in a loss of the received data and an increase of the bit error rate (BER).

Besides, even though the phase difference and amplitude difference can be calibrated, when the frequency of the input baseband signal varies or the baseband signal is input to a communication system that has a wider frequency band, there may still be mismatches between the in-phase signal path and the quadrature signal path of the receiver due to the frequency dependency, because mismatches between local oscillators and between mixers are not that much related to the frequency of the baseband signal. The above mismatches due to the frequency dependency are caused by differences between electrical characteristics of the corresponding circuit elements in the in-phase signal path and in the quadrature signal path, such as differences between electrical characteristics of the filter in the in-phase signal path and the filter in the quadrature signal path. In other words, the mismatches between the in-phase signal path and the quadrature signal path of the receiver may be generated because of certain defects in the electric element manufacturing process, which makes the electrical characteristics of the corresponding electric elements in the in-phase signal path and in the quadrature signal path not match perfectly, further making the signals passing through the in-phase signal path and the quadrature signal path different and generating an unexpected image interference. Accordingly, how to compensate mismatches between the in-phase signal path and the quadrature signal path of a receiver resulting from the frequency dependency is still a problem to be solved.

SUMMARY OF THE INVENTION

The instant disclosure provides a calibration method, used to calibrate mismatches between a first signal path and a second signal path of a receiver. A delay chain is configured in the first signal path of the receiver to delay a signal transmitted through the first signal path. A finite impulse response filter (herein after FIR filter) is configured in the second signal path of the receiver to compensate the mismatches between the first signal path and the second signal path. The calibration method comprises: inputting a multiple-frequency signal to a first mixer in the first signal path and to a second mixer in the second signal path, to generate a first frequency mixing signal corresponding to the first mixer and a second frequency mixing signal corresponding to the second mixer; selecting from the first frequency mixing signal and the second frequency mixing signal by a first switching circuit, and respectively inputting a selection result generated by the first switching circuit to a low-pass filter in the first signal path and inputting the second frequency mixing signal to a low-pass filter in the second signal path; respectively inputting an output of the low-pass filter in the first signal path and an output of the low-pass filter in the second signal path to an analog-to-digital converter in the first signal path and an analog-to-digital converter in the second signal path, to generate a first test signal corresponding to the first signal path and a second test signal corresponding to the second signal path; respectively inputting the first test signal and the second test signal to the delay chain and the FIR filter, to generate a delay signal and a compensated output signal; and executing a subtraction operation between the delay signal and the compensated output signal to obtain a first calibration coefficient related to the FIR filter in the second signal path, and calibrating a plurality of tap coefficients of the FIR filter by the first calibration coefficient, such that the calibrated FIR filter in the second signal path compensates the mismatches between the first signal path and the second signal path.

The instant disclosure further provides a calibration circuit, used to calibrate mismatches between a first signal path and a second signal path of a receiver. A delay chain is configured in the first signal path of the receiver to delay a signal transmitted through the first signal path. A FIR filter is configured in the second signal path of the receiver to compensate the mismatches between the first signal path and the second signal path. The calibration circuit comprises a frequency mixing signal generating unit, a test signal generating unit and a calibration unit. The frequency mixing signal generating unit inputs a multiple-frequency signal to a first mixer in the first signal path and to a second mixer in the second signal path, to generate a first frequency mixing signal corresponding to the first mixer and a second frequency mixing signal corresponding to the second mixer. The test signal generating unit selects from the first frequency mixing signal and the second frequency mixing signal by a first switching circuit, respectively inputs a selection result generated by the first switching circuit and the second frequency mixing signal to a low-pass filter in the first signal path and to a low-pass filter in the second signal path, and respectively inputs an output of the low-pass filter in the first signal path and an output of the low-pass filter in the second signal path to an analog-to-digital converter in the first signal path and an analog-to-digital converter in the second signal path, to generate a first test signal corresponding to the first signal path and a second test signal corresponding to the second signal path. The calibration unit respectively inputs the first test signal and the second test signal to the delay chain and the FIR filter to generate a delay signal and a compensated output signal, executes a subtraction operation between the delay signal and the compensated output signal to obtain a first calibration coefficient related to the FIR filter in the second signal path, and calibrates a plurality of tap coefficients of the FIR filter by the first calibration coefficient, such that the calibrated FIR filter in the second signal path compensates the mismatches between the first signal path and the second signal path.

To sum up, the calibration method and the calibration circuit provided by the instant disclosure calibrates a plurality of tap coefficients of the FIR filter in the second signal path and determines optimum values to be the tap coefficients of the FIR filter, according to the differences between different electrical characteristics of the analog-to-digital convertor (ADC) and the low-pass filter configured in the first signal path and the ADC and the low-pass filter configured in the second signal path, which are obtained when the data reception has not yet started by the receiver (that is, when the receiver is working in a training mode). Compared with the conventional calibration method and calibration circuit, the calibration method and the calibration circuit provided by the instant disclosure may compensate mismatches between the first signal path and the second signal path of a receiver with a high efficiency and a high accuracy.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
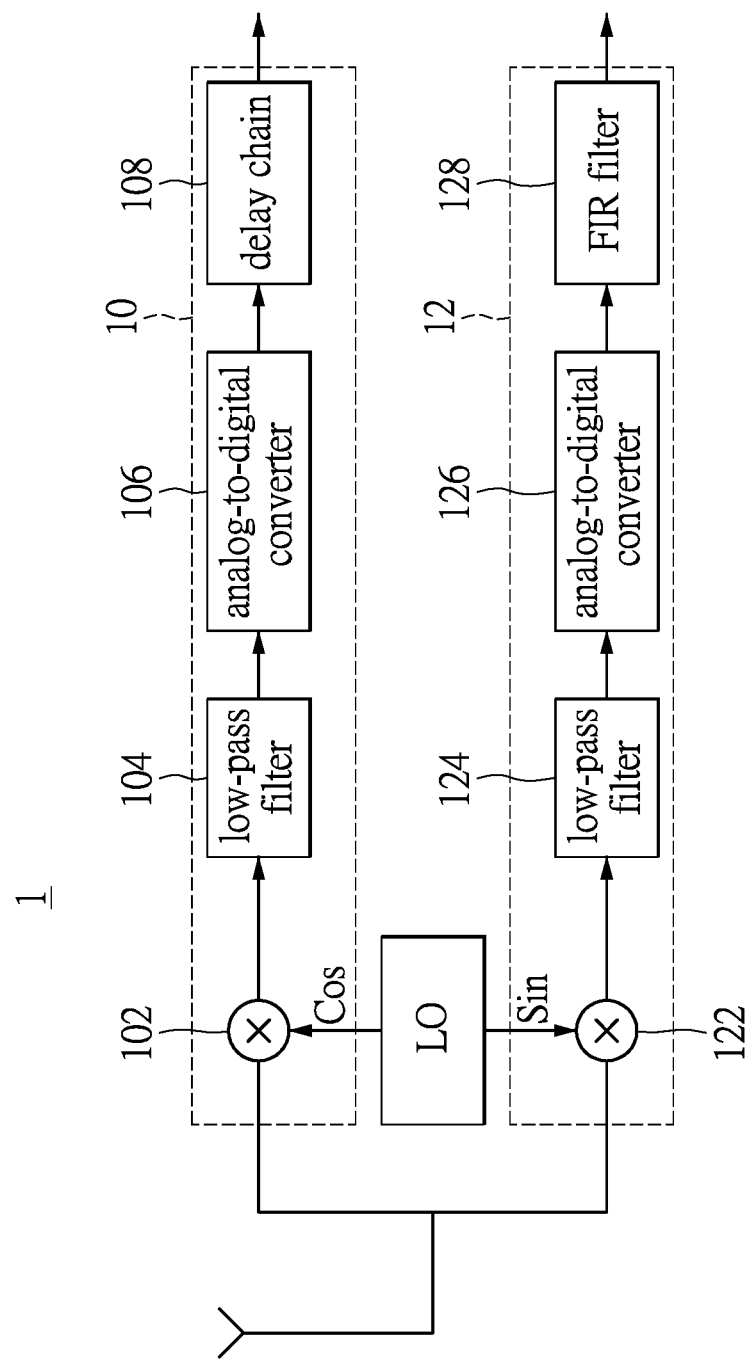
FIG. 1 shows a block diagram of a receiver of one embodiment of the instant disclosure.

The calibration method provided by the instant disclosure can be used in a receiver in any communication system. For example, the communication system may be the orthogonal frequency-division multiplexing (OFDM) system, but it is not limited herein. Refer to FIG. 1. FIG. 1 shows a block diagram of a receiver of one embodiment of the instant disclosure. The receiver 1 has a first signal path 10 and a second signal path 12. The first signal path 10 comprises a mixer 102, a low-pass filter 104 and an analog-to-digital converter 106, and the second signal path 12 comprises a mixer 122, a low-pass filter 124 and an analog-to-digital converter 126. In addition, a delay chain 108 is configured in the first signal path 10 to delay an input signal of the first signal path 10, and a finite impulse response filter (herein after FIR filter) 128 is configured in the second signal path 12 to compensate mismatches between the first signal path 10 and the second signal path 12. It is worth mentioning that, the working principles of the delay chain 108 and the FIR filter 128 are easily understood by those skilled in the art, and thus the information is not repeated here.

As described, the FIR filter 128 may compensate the mismatches between the first signal path 10 and the second signal path 12. In other words, the FIR filter 128 may compensate differences between the electrical characteristics of the low-pass filters 104 and 124, and differences between the electrical characteristics of the analog-to-digital converters 106 and 126. However, when the receiver 1 is normally working, the mismatches between the first signal path 10 and the second signal path 12 vary with factors such as temperature. Thus, another calibration is needed for the variation of the mismatches between the first signal path 10 and the second signal path 12, which takes quite some time. In this case, for the receiver 1, the mismatches between the first signal path 10 and the second signal path 12 cannot be compensated accurately and effectively.

Figure 2:
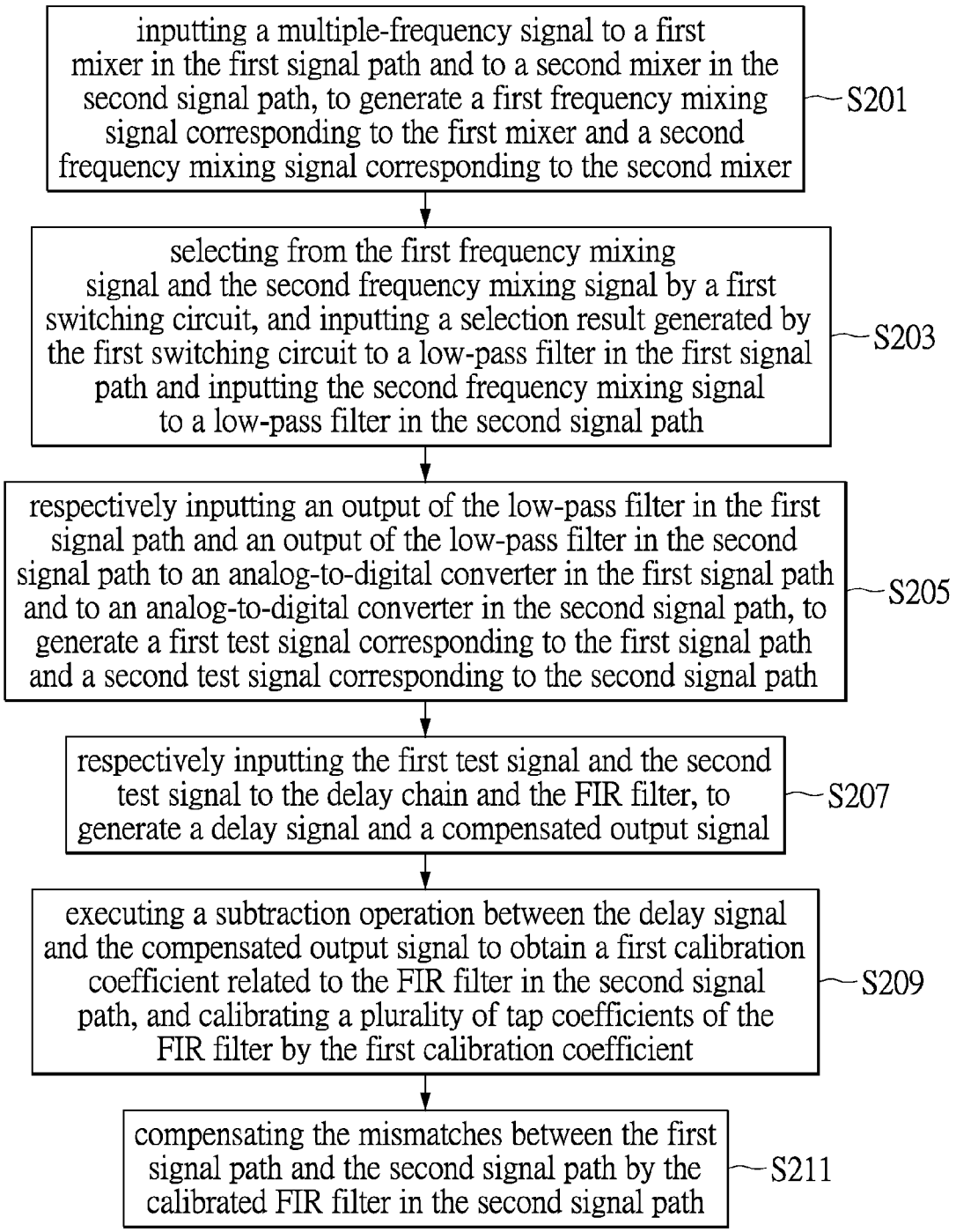
FIG. 2 shows a flow chart of a calibration method of one embodiment of the instant disclosure.

Refer to FIG. 2. FIG. 2 shows a flow chart of a calibration method of one embodiment of the instant disclosure. The calibration method provided by the embodiment shown in FIG. 2 can be implemented by the receiver 1 shown in FIG. 1, and thus please refer to FIGS. 1 and 2 for easy understanding.

In Step S201, a multiple-frequency signal is input to the first mixer (that is, the mixer 102) in the first signal path 10 and the second mixer (that is, the mixer 122) in the second signal path 12 respectively, to generate a first frequency mixing signal corresponding to the first mixer and a second frequency mixing signal corresponding to the second mixer. In step S203, a signal selection is executed between the first frequency mixing signal and the second frequency mixing signal by a first switching circuit. After that, a selection result generated by the first switching circuit is input to a low-pass filter 104 in the first signal path 10 and the second frequency mixing signal is input to a low-pass filter 124 in the second signal path 12.

In step S205, an output of the low-pass filter 104 in the first signal path 10 and an output of the low-pass filter 124 in the second signal path 12 are respectively input to an analog-to-digital converter 106 in the first signal path 10 and an analog-to-digital converter 126 in the second signal path 12, to generate a first test signal corresponding to the first signal path 10 and a second test signal corresponding to the second signal path 12. After that, in step S207, the first test signal and the second test signal are respectively input to a delay chain 108 and a FIR filter 128, to severally generate a delay signal and a compensated output signal.

In step S209, a subtraction operation is executed for the delay signal and the compensated output signal to obtain a first calibration coefficient related to the FIR filter 128 in the second signal path 12. A plurality of tap coefficients of the FIR filter is calibrated by the first calibration coefficient. Finally, in step S211, the calibrated FIR filter 128 compensates the mismatches between the first signal path 10 and the second signal path 12 of the receiver 1.

According to the above description, it is easily understood that, in the instant disclosure, before the receiver 1 starts to receive data (that is, when the receiver 1 is working in a training mode), differences between the electrical characteristics of the low-pass filter 104 in the first signal path 10 and the low-pass filter 124 in the second signal path 12, and differences between the electrical characteristics of the analog-to-digital converter 106 in the first signal path 10 and the analog-to-digital converter 126 in the second signal path 12 are found by a multiple-frequency signal automatically generated by the receiver 1. Moreover, after a multiple-frequency signal passes through the low-pass filter 104 and the analog-to-digital converter 106 in the first signal path 10, and passes through the low-pass filter 124 and the analog-to-digital converter 126 in the second signal path 12, the multiple-frequency signal is input to the delay chain 108 and the FIR filter 128 respectively.

After that, a first calibration coefficient related to the FIR filter 128 is calculated based on an output from the delay chain 108 and an output from the FIR filter 128. A plurality of tap coefficients of the FIR filter is calibrated by the first calibration coefficient, and then the optimum values to be the tap coefficients of the FIR filter 128 are determined. Finally, when the receiver 1 starts to receive data (that is, the receiver 1 is working in a normal data receiving mode), the receiver 1 can use the FIR filter 128 having calibrated tap coefficients to compensate mismatches between the first signal path 10 and the second signal path 12. Thereby, the mismatches between the first signal path 10 and the second signal path 12 can be effectively compensated. From the above, it can be understood that, steps S201~S209 are executed before the receiver 1 starts to receive data (that is, when the receiver 1 is working in the training mode).

Figure 3:
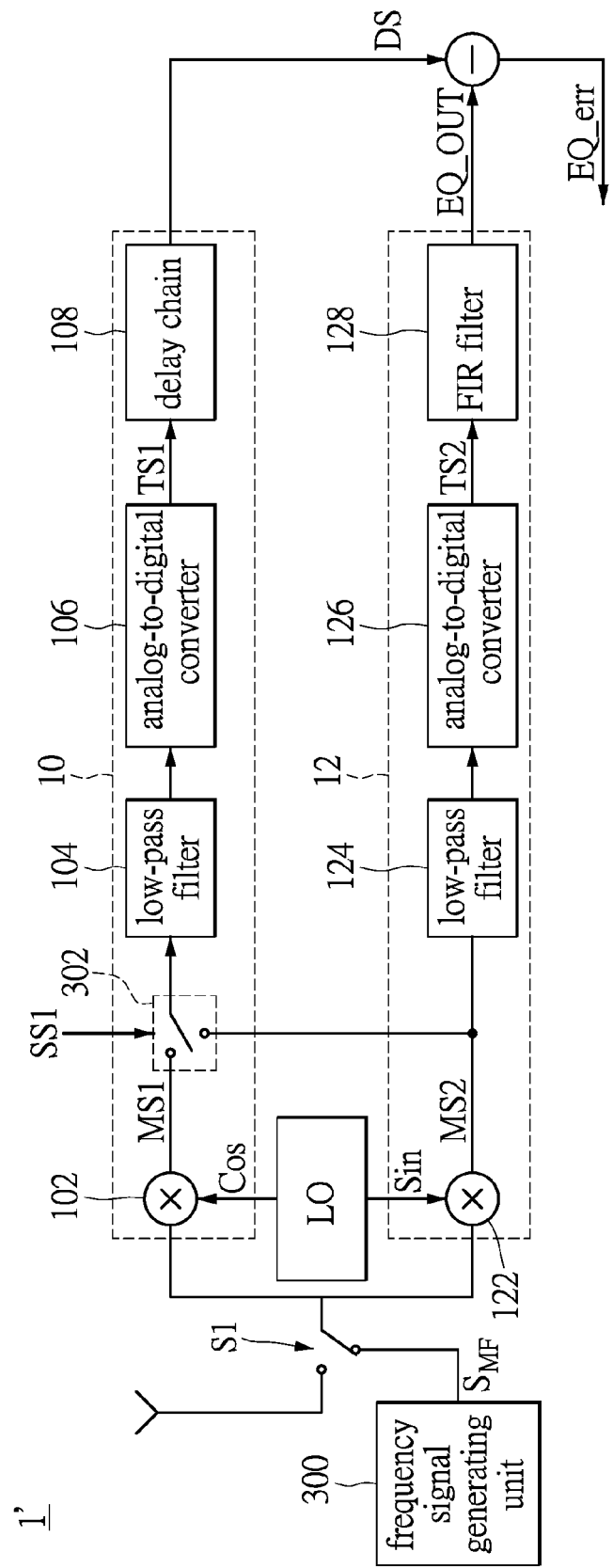
FIG. 3 shows a block diagram of a receiver of another embodiment of the instant disclosure.

To further illustrate details about how steps S201~S209 are executed in the receiver 1, another embodiment is provided herein. Refer to FIG. 3. FIG. 3 shows a block diagram of a receiver of another embodiment of the instant disclosure. In the following description, only parts different from the embodiment in FIG. 1 are described, and the omitted parts are indicated to be identical to the embodiments in FIG. 1. In addition, for easy instruction, in FIG. 1 and FIG. 3, similar reference numbers or symbols refer to similar elements.

Compared with the receiver 1 shown in FIG. 1, the receiver 1' shown in FIG. 3 further comprises a switch S1. When the receiver 1' is working in the training mode, if the data signal received by the antenna cannot be a signal source (that is, the data signal is a discontinued multiple-frequency signal), the mixers 102 and 122 (that is, the first mixer and the second mixer) can be both connected to a frequency signal generating unit 300 by the switch S1, and the frequency signal generating unit 300 works as a signal source to output a multiple-frequency signal respectively to the first mixer 102 in the first signal path 10 and to the second mixer 122 in the second signal path 12. Additionally, the cosine signal Cos and the sine signal Sin output from a local oscillator LO are respectively input to the first mixer 102 and the second mixer 122 at the same time, to execute a frequency mixing with the multiple-frequency signal $S_{MF}$ and to generate a first frequency mixing signal MS1 corresponding to the first mixer 102 and a second frequency mixing signal MS2 corresponding to the second mixer 122. The working principles of the local oscillator LO, the first mixer 102 and the second mixer 122 are easily understood by those skilled in the art and thus the information is not repeated here.

In the prior art, a single frequency signal is often used as a signal source in the training mode of a receiver. However, in the calibration method provided by the instant disclosure, it is a multiple-frequency signal $S_{MF}$ that is used as a signal source in the training mode, which helps to find differences between the electrical characteristics of the low-pass filter 104 in the first signal path 10 and low-pass filter 124 in the second signal path 12, and differences between the electrical characteristics of the analog-to-digital converter 106 in the first signal path 10 and the analog-to-digital converter 126 in the second signal path 12, and also helps to optimize tap coefficients of the FIR filter 128.

The receiver 1' shown in FIG. 3 further comprises a first switching circuit 302. The first terminal of the first switching circuit 302 is electrically connected to the low-pass filter 104 in the first signal path 10, and the second terminal and the third terminal of the first switching circuit 302 are electrically connected to the first mixer 102 and the second mixer 122 respectively. The second terminal and the third terminal of the first switching circuit 302 respectively receive a first frequency mixing signal MS1 from the first mixer 102 and a second frequency mixing signal MS2 from the second mixer 122. It is worth mentioning that, the first switching circuit 302 is controlled by a first switch control signal SS1 to selectively connect the first terminal of the first switching circuit 302 to the second terminal or to the third terminal of the first switching circuit 302.

From the above, it is easily understood that, when the second terminal and the first terminal of the first switching circuit 302 are connected, it indicates that the first frequency mixing signal MS1 and the second frequency mixing signal MS2 can be respectively input to the low-pass filter 104 in the first signal path 10 and to the low-pass filter 124 in the second signal path 12. On the contrary, when the third terminal and the first terminal of the first switching circuit 302 are connected, it indicates that the second frequency mixing signal MS2 is not only input to the low-pass filter 104 in the first signal path 10 but also to the low-pass filter 124 in the second signal path 12.

As described, the achievement of the instant disclosure is to find differences between the electrical characteristics of the low-pass filter 104 in the first signal path 10 and the low-pass filter 124 in the second signal path 12, and differences between the electrical characteristics of the analog-to-digital converter 106 in the first signal path 10 and the analog-to-digital converter 126 in the second signal path 12, so as to determine the optimum values to be the tap coefficients of the FIR filter 128. When step S203 shown in FIG. 2 is executed by the receiver 1' shown in FIG. 3, the first switching circuit 302 is controlled by a first switch control signal SS1 to connect the first terminal and the third terminal of the first switching circuit 302, such that the second frequency mixing signal MS2 can be simultaneously input to the low-pass filter 104 in the first signal path 10 and to the low-pass filter 124 in the second signal path 12.

After that, the output of the low-pass filter 104 and the output of the low-pass filter 124 are respectively input to the analog-to-digital converter 106 and the analog-to-digital converter 126, to severally generate a first test signal TS1 corresponding to the first signal path 10 and a second test signal TS2 corresponding to the second signal path 12. The first test signal TS1 is input to the delay chain 108 to generate a delay signal DS, and the second test signal TS2 is input to the FIR filter 128 to generate a compensated output signal EQ_OUT. Based on the delay signal DS and the compensated output signal EQ_OUT, the receiver 1' can find differences between the electrical characteristics of the low-pass filter 104 in the first signal path 10 and the low-pass filter 124 in the second signal path 12, and differences between the electrical characteristics of the analog-to-digital converter 106 in the first signal path 10 and the analog-to-digital converter 126 in the second signal path 12. The compensated output signal EQ_OUT obtained in step S207 can be represented as following equation (1).

$$EQ\_OUT=\text{sum}(\text{Input}\_n * \text{Coef}\_n) \quad \text{Equation (1)}$$

In the equation (1), "Input_n" is the $n^{th}$ value input to the FIR filter 128 (that is, the $n^{th}$ value of the second test signal TS2), and "Coef_n" is the $n^{th}$ tap coefficient of the FIR filter 128. It is worth mentioning that, in step S207, the tap coefficients have not yet been calibrated, so "Coef_n" is an initial value of the $n^{th}$ tap coefficient of the FIR filter 128. In addition, a first calibration coefficient EQ_err obtained in step S209 can be represented as following equation (2).

$$EQ\_err = DS - EQ\_OUT \quad \text{Equation (2)}$$

After that, in step S209, the calibration based on the first calibration coefficient EQ_err for the tap coefficients Coef_n of the FIR filter 128 can be represented as following equation (3).

$$\text{Coef}\_n' = \text{Coef}\_n + (\text{step} * EQ\_err * \text{Input}\_n) \quad \text{Equation (3)}$$

"Coef_n" is the $n^{th}$ calibrated tap coefficient, and "step" is a programmable coefficient. It is worth mentioning that, the calibration for the tap coefficient Coef_n represented by the equation (3) is only an example, and it is not limited herein. For example, the calibration based on the first calibration coefficient EQ_err for the tap coefficients Coef_n of the FIR filter 128 can also be represented as an equation (4).

$$\text{Coef}\_n' = \text{Coef}\_n + (\text{step} * \text{Sin\_of}\_EQ\_err * \text{Input}\_n) \quad \text{Equation (4)}$$

"Sin_of_EQ_err" is represented as a symbol bit of the first calibration coefficient EQ_err. For example, if the first calibration coefficient EQ_err is larger than zero, the symbol bit Sin_of_EQ_err is "1". If the first calibration coefficient EQ_err is smaller than zero, the symbol bit Sin_of_EQ_err is "−1". If the first calibration coefficient EQ_err is equal to zero, the symbol bit Sin_of_EQ_err is "0". Thus, the calibration based on the first calibration coefficient EQ_err for the tap coefficients Coef_n of the FIR filter 128 can be set by those skilled in the art as needed, and it is not limited herein.

Finally, after the receiver 1' calculates and obtains the calibrated tap coefficients Coef_n', the receiver 1' may start to work in the normal data receiving mode. (In other words, the switch 51 makes the first mixer 102 and the second mixer 122 connect to the antenna. In addition, the first switching circuit 302 is controlled by the first switch control signal SS1, such that the second terminal and the first terminal of the first switching circuit 302 are connected.) When the receiver 1' is working in the normal data receiving mode, the mismatches between the first signal path 10 and the second signal path 12 may still exist and vary with factors such as temperature. However, the receiver 1' may be switched to the training mode anytime, and thus based on previously obtained calibration coefficient it will only take a little time for the receiver 1' to finely tune the tap coefficients of the FIR filter 128. Therefore, compared with the prior art, the calibration method provided by the instant disclosure can compensate mismatches between the first signal path 10 and the second signal path 12 with a high efficiency and a high accuracy. In addition, based on the known information described above those skilled in the art would understand that, one of the first signal path 10 and the second signal path 12 may be an in-phase signal path, while the other one may correspondingly be a quadrature signal path, but it is not limited herein.

Figure 4:
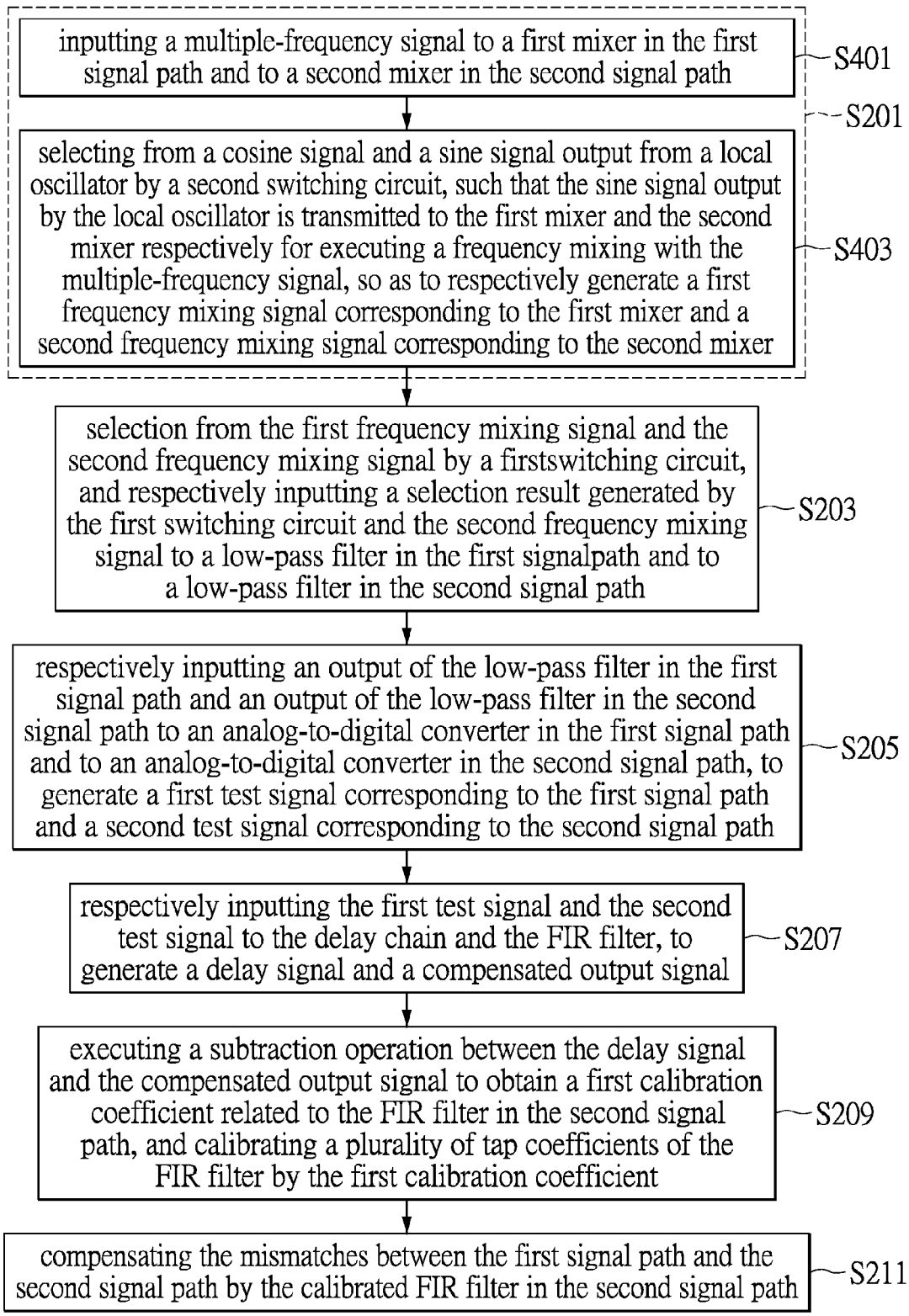
FIG. 4 shows a flow chart of a calibration method of another embodiment of the instant disclosure.
Figure 5:
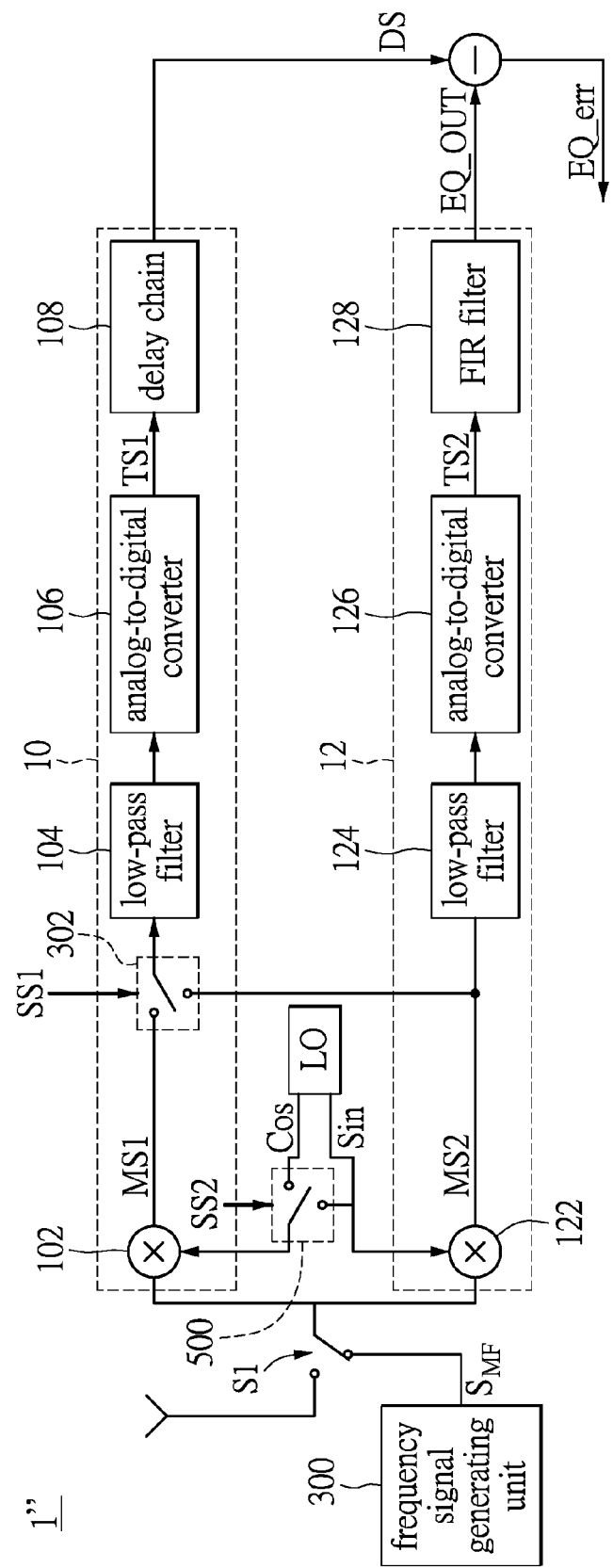
FIG. 5 shows a block diagram of a receiver of still another embodiment of the instant disclosure.

It is worth mentioning that, there may be mismatches between the first mixer 102 and the second mixer 122 in the receiver 1', and thus another embodiment described below is for illustrating how to obtain the first calibration coefficient EQ_err of the FIR filter 128 in the second signal path 12 in the instant disclosure. In conjunction with FIG. 4 and FIG. 5, FIG. 4 shows a flow chart of a calibration method of another embodiment of the instant disclosure, and FIG. 5 shows a block diagram of a receiver of still another embodiment of the instant disclosure. The calibration method shown in FIG. 4 can be executed by the receiver shown in FIG. 5, but it is not limited herein. In addition, for easy instruction, similar reference numbers or symbols refer to similar steps in FIG. 4 and FIG. 2, and similar reference numbers or symbols refer to similar elements in FIG. 5 and FIG. 3.

In conjunction with FIG. 2, FIG. 4 and FIG. 5, step S201 may further comprise steps S401~S403. Compared with the receiver 1' shown in FIG. 3, the receiver 1" shown in FIG. 5 further comprises a second switching circuit 500. The first terminal of the second switching circuit 500 is electrically connected to the first mixer 102, the second terminal and the third terminal of the second switching circuit 500 are both electrically connected to the local oscillator LO, wherein the second terminal and the third terminal of the second switching circuit 500 respectively receive a cosine signal Cos and a sine signal Sin output from the local oscillator LO. It is worth mentioning that, the second switching circuit 500 is controlled by a second switch control signal SS2 to selectively connect the first terminal of the second switching circuit 500 to the second terminal or to the third terminal of the second switching circuit 500.

In step S401, a multiple-frequency signal $S_{MF}$ is input to both the first mixer 102 in the first signal path 10 and the second mixer 122 in the second signal path 12. In step S403, a signal selection between a cosine signal Cos and a sine signal Sin output from the local oscillator is executed by a second switching circuit 500. After that, a selection result generated by the second switching circuit 500 and the sine signal Sin are respectively input to the first mixer 102 and to the second mixer 122, for executing a frequency mixing with the multiple-frequency signal $S_{MF}$, so as to respectively generate a first frequency mixing signal MS1 and a second frequency mixing signal MS2.

From the above, those skilled in the art should be able to understand that, when the first terminal and the second terminal of the second switching circuit 500 are connected, it indicates that, in the receiver 1" the second switching circuit 500 is controlled to make the cosine signal Cos and the sine signal Sin output by the local oscillator LO respectively input to the first mixer 102 in the first signal path 10 and to the second mixer 122 in the second signal path 122. On the contrary, when the third terminal and the first terminal of the second switching circuit 500 are connected, it indicates that, the second switching circuit 500 is controlled to make the sine signal Sin output from the local oscillator LO not only input to the first mixer 102 in the first signal path 10 but also input to the second mixer 122 in the second signal path 122.

Again refer to FIG. 5. In the training mode, when the first switching circuit 302 is controlled by the first switch control signal SS1 to make the first terminal and the third terminal of the first switching circuit 302 connected, no matter whether the second switching circuit 500 is controlled by the second switch control signal SS2 to make the first terminal and the second of the second switching circuit 500 connected or to make the first terminal and the third terminal of the second switching circuit 500 connected, the first switching circuit 302 dominates as a key switch.

On the other hand, in the training mode, when the first switching circuit 302 is controlled by the first switch control signal SS1 to make the first terminal and the second terminal of the first switching circuit 302 connected, the second switching circuit 500 must be correspondingly controlled by the second switch control signal SS2 to make the third terminal and the first terminal of the second switching circuit 500 connected, such that the sine signal Sin output by the local oscillator LO can be input to the first mixer 102 and the second mixer 122 simultaneously. Thereby, according to the delay signal DS and the compensated output signal EQ_OUT, the receiver 1" may effectively find differences between the electrical characteristics of the first mixer 102, the low-pass filter 104 and the analog-to-digital converter 106 in the first signal path 10 and the second mixer 122, the low-pass filter 124 and the analog-to-digital converter 126 in the second signal path 12.

One of achievements provided by the embodiments shown in FIG. 4 and FIG. 5 is that, a second switching circuit 500 is additionally configured to be electrically connected to the LO, the first mixer 102 and the second mixer 122, such that the receiver 1" can determine whether to compensate the mismatches between the first mixer 102 and the second mixer 122. If the receiver 1" determines to compensate the mismatches between the first mixer 102 and the second mixer 122, a more accurate first calibration coefficient EQ_err can be thus obtained, which effectively helps to compensate the mismatches between the first signal path 10 and the second signal path 12.

If the receiver 1" determines to compensate the mismatches between the first mixer 102 and the second mixer 122, in the training mode when the first switching circuit 302 is controlled by the first switch control signal SS2 to connect the first terminal and the second terminal of the first switching circuit 302, the second switching circuit 500 must be controlled by the second switch control signal SS2 to connect the third terminal and the first terminal of the second switching circuit 500. In this case, the second switching circuit 500 dominates as a key switch. However, the above embodiments are for illustrating but not for restricting the instant disclosure.

Figure 6:
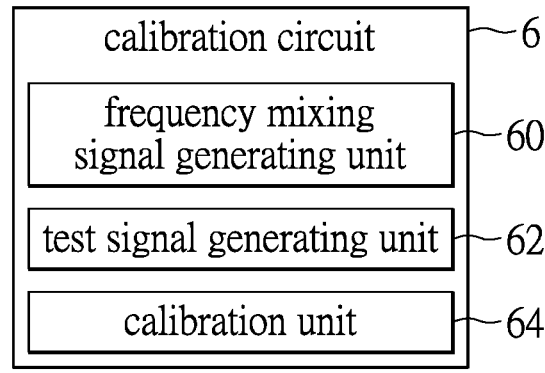
FIG. 6 shows a block diagram of a calibration circuit of one embodiment of the instant disclosure.

Finally, in order to further illustrate the calibration method in the instant disclosure, there is an embodiment of a calibration circuit provided herein. Refer to FIG. 6. FIG. 6 shows a block diagram of a calibration circuit of one embodiment of the instant disclosure, and the calibration circuit 6 shown in FIG. 6 is only one example circuit that can execute the calibration method in the above embodiments. No limitations are attempted to be made herein.

The calibration circuit 6 comprises a frequency mixing signal generating unit 60, a test signal generating unit 62 and a calibration unit 64. Each unit above can be implemented by only hardware circuits or combinations of hardware circuits and a firmware or software, and it is not limited herein. In addition, the units described above can be integrated with each other or each of them can be independent, and it is also not limited herein.

The frequency mixing signal generating unit 60 inputs a multiple-frequency signal to both the first mixer in the first signal path and the second mixer in the second signal path, so as to respectively generate a first frequency mixing signal corresponding to the first mixer and a second frequency mixing signal corresponding to the second mixer.

The test signal generating unit 62 utilizes a first switching circuit to select from the first frequency mixing signal and the second frequency mixing signal. The test signal generating unit 62 respectively inputs a selection result generated by the first switching circuit and the second frequency mixing signal to a low-pass filter in the first signal path and to a low-pass filter in the second signal path. After that, the test signal generating unit 62 respectively inputs an output of the low-pass filter in the first signal path to an analog-to-digital converter in the first signal path, and inputs an output of the low-pass filter in the second signal path to an analog-to-digital converter in the second signal path, so as to generate a first test signal corresponding to the first signal path and a second test signal corresponding to the second signal path.

The calibration unit 64 respectively inputs the first test signal and the second test signal to the delay chain and the FIR filter, to generate a delay signal and a compensated output signal. After that, the calibration unit 64 executes a subtraction operation between the delay signal and the compensated output signal to obtain a first calibration coefficient related to the FIR filter in the second signal path. According to the first calibration coefficient, the calibration unit 64 calibrates a plurality of tap coefficients of the FIR filter, such that the calibrated FIR filter in the second signal path can compensate the mismatches between the first signal path and the second signal path.

In conjunction with FIG. 3 and FIG. 6, the calibration circuit 6 can work with the receiver 1' shown in FIG. 3, but details herein are not repeated.

Figure 7:
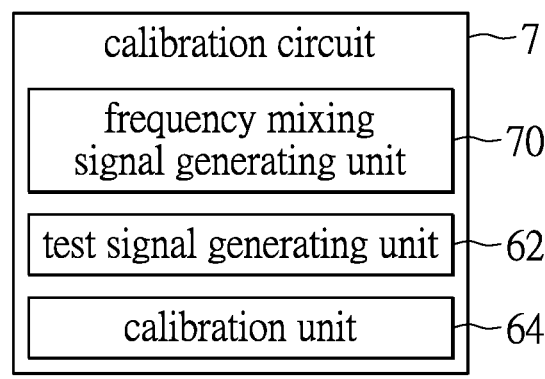
FIG. 7 shows a block diagram of a calibration circuit of another embodiment of the instant disclosure.

As mentioned, if the mismatches between the first mixer and the second mixer are also compensated, a more accurate first calibration coefficient can be obtained, which can be illustrated by another embodiment as below. Refer to FIG. 7. FIG. 7 shows a block diagram of a calibration circuit of another embodiment of the instant disclosure. However, the calibration circuit 7 shown in FIG. 7 is only one example circuit that may execute the calibration method in the above-mentioned embodiments. In addition, for easy instruction, in FIG. 6 and FIG. 7, similar reference numbers or symbols refer to similar elements.

Briefly, compared with the frequency mixing signal generating unit 60 shown in FIG. 6, the frequency mixing signal generating unit 70 shown in FIG. 7 inputs a multiple-frequency signal to the first mixer in the first signal path and to the second mixer in the second signal path, and selects from a cosine signal and a sine signal output from a local oscillator by a second switching circuit. After that, the frequency mixing signal generating unit 70 inputs a selection result generated by the second switching circuit and the sine signal to the first mixer and to the second mixer respectively in order to correspondingly mix with the multiple-frequency signal in the signal path, which accordingly generates a first frequency mixing signal corresponding to the first mixer and a second frequency mixing signal corresponding to the second mixer.

In conjunction with FIG. 5 and FIG. 7, the calibration circuit 7 shown in FIG. 7 can work with the receiver 1" shown in FIG. 5, but details herein are not repeated.

To sum up, the calibration method and the calibration circuit provided by the instant disclosure calibrate a plurality of tap coefficients of the FIR filter in the second signal path and determines optimum values to be the tap coefficients of the FIR filter, according to differences between different electrical characteristics of the ADC and the LPF configured in the first signal path and the ADC and the LPF configured in the second signal path, which are obtained when the data reception has not yet started by the receiver (that is, when the receiver is working in a training mode.) Compared with the conventional calibration method and calibration circuit, the calibration method and the calibration circuit provided by the instant disclosure can compensate mismatches between the first signal path and the second signal path of a receiver with higher efficiency and better accuracy.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A calibration method, used to calibrate mismatches between a first signal path and a second signal path of a receiver, wherein a delay chain is configured in the first signal path of the receiver to delay a signal transmitted through the first signal path, and a finite impulse response filter is configured in the second signal path of the receiver to compensate the mismatches between the first signal path and the second signal path, the calibration method comprising:

inputting a multiple-frequency signal to a first mixer in the first signal path and to a second mixer in the second signal path, to generate a first frequency mixing signal corresponding to the first mixer and a second frequency mixing signal corresponding to the second mixer;

selecting from the first frequency mixing signal and the second frequency mixing signal by a first switching circuit, and respectively inputting a selection result generated by the first switching circuit and the second frequency mixing signal to a low-pass filter in the first signal path and to a low-pass filter in the second signal path;

respectively inputting an output of the low-pass filter in the first signal path and an output of the low-pass filter in the second signal path to an analog-to-digital converter in the first signal path and to an analog-to-digital converter in the second signal path, to generate a first test signal corresponding to the first signal path and a second test signal corresponding to the second signal path;

respectively inputting the first test signal and the second test signal to the delay chain and the finite impulse response filter, to generate a delay signal and a compensated output signal correspondingly; and executing a subtraction operation between the delay signal and the compensated output signal to obtain a first calibration coefficient related to the finite impulse response filter in the second signal path, and calibrating a plurality of tap coefficients of the finite impulse response filter by the first calibration coefficient, such that the calibrated finite impulse response filter in the second signal path compensates the mismatches between the first signal path and the second signal path.

2. The calibration method according to claim 1, wherein a first terminal of the first switching circuit is electrically connected to the low-pass filter in the first signal path, a second terminal and a third terminal of the first switching circuit are electrically connected to the first mixer and the second mixer respectively, and the second terminal and the third terminal of the first switching circuit respectively receive the first frequency mixing signal from the first mixer and the second frequency mixing signal from the second mixer, wherein the first switching circuit is controlled by a first switch control signal to selectively connect the first terminal of the first switching circuit to the second terminal or to the third terminal of the first switching circuit.

3. The calibration method according to claim 2, wherein the step of generating the first frequency mixing signal and the second frequency mixing signal further comprises:

selecting from a cosine signal and a sine signal output by a local oscillator by a second switching circuit, and respectively inputting a selection result generated by the second switching circuit and the sine signal to the first mixer and to the second mixer to mix with the multiple-frequency signal so as to respectively generate the first frequency mixing signal and the second frequency mixing signal.

4. The calibration method according to claim 3, wherein a first terminal of the second switching circuit is electrically connected to the first mixer, a second terminal and a third terminal of the second switching circuit are both electrically connected to the local oscillator, and the second terminal and the third terminal of the second switching circuit respectively receive the cosine signal and the sine signal output by the local oscillator, wherein the second switching circuit is controlled by a second switch control signal to selectively connect the first terminal of the second switching circuit to the second terminal or to the third terminal of the second switching circuit.

5. The calibration method according to claim 4, wherein before obtaining the first calibration coefficient, when the first terminal and the second terminal of the first switching circuit are connected, the second switching circuit is controlled by the second switch control signal such that the third terminal and the first terminal of the second switching circuit are connected.

6. The calibration method according to claim 1, wherein one of the first signal path and the second signal path is an in-phase signal path and the other one is a quadrature signal path.

7. A calibration circuit, used to calibrate mismatches between a first signal path and a second signal path of a receiver, wherein a delay chain is configured in the first signal path of the receiver to delay a signal transmitted through the first signal path, and a finite impulse response filter is configured in the second signal path of the receiver to compensate the mismatches between the first signal path and the second signal path, the calibration circuit comprising:

a frequency mixing signal generating unit, inputting a multiple-frequency signal to a first mixer in the first signal path and to a second mixer in the second signal path, to generate a first frequency mixing signal corresponding to the first mixer and a second frequency mixing signal corresponding to the second mixer;

a test signal generating unit, utilizing a first switching circuit to select from the first frequency mixing signal and the second frequency mixing signal, respectively inputting a selection result generated by the first switching circuit and the second frequency mixing signal to a low-pass filter in the first signal path and to a low-pass filter in the second signal path, and respectively inputting an output of the low-pass filter in the first signal path and an output of the low-pass filter in the second signal path to an analog-to-digital converter in the first signal path and an analog-to-digital converter in the second signal path, to generate a first test signal corresponding to the first signal path and a second test signal corresponding to the second signal path; and a calibration unit, respectively inputting the first test signal and the second test signal to the delay chain and the finite impulse response filter to generate a delay signal and a compensated output signal, executing a subtraction operation between the delay signal and the compensated output signal to obtain a first calibration coefficient related to the finite impulse response filter in the second signal path, and calibrating a plurality of tap coefficients of the finite impulse response filter by the first calibration coefficient, such that the calibrated finite impulse response filter in the second signal path compensates the mismatches between the first signal path and the second signal path.

8. The calibration circuit according to claim 7, wherein a first terminal of the first switching circuit is electrically connected to the low-pass filter in the first signal path, a second terminal and a third terminal of the first switching circuit are electrically connected to the first mixer and the second mixer respectively, and the second terminal and the third terminal of the first switching circuit respectively receive the first frequency mixing signal from the first mixer and the second frequency mixing signal from the second mixer, wherein the first switching circuit is controlled by a first switch control signal to selectively connect the first terminal of the first switching circuit and the second terminal or the third terminal of the first switching circuit.

9. The calibration circuit according to claim 8, wherein the frequency mixing signal generating unit utilizes a second switching circuit to select from a cosine signal and a sine signal output by a local oscillator, and respectively inputting a selection result generated by the second switching circuit and the sine signal to the first mixer and to the second mixer for executing a frequency mixing with the multiple-frequency signal so as to respectively generate the first frequency mixing signal and the second frequency mixing signal.

10. The calibration circuit according to claim 9, wherein a first terminal of the second switching circuit is electrically connected to the first mixer, a second terminal and a third terminal of the second switching circuit are both electrically connected to the local oscillator, and the second terminal and the third terminal of the second switching circuit respectively receive the cosine signal and the sine signal output by the local oscillator, wherein the second switching circuit is controlled by a second switch control signal to selectively connect the first terminal of the second switching circuit to the second terminal or to the third terminal of the second switching circuit.

11. The calibration circuit according to claim 10, wherein before obtaining the first calibration coefficient, if the first terminal and the second terminal of the first switching circuit are connected, the second switching circuit is controlled by the second switch control signal such that the third terminal and the first terminal of the second switching circuit are connected.

12. The calibration circuit according to claim 7, wherein one of the first signal path and the second signal path is an in-phase signal path and the other one is a quadrature signal path.

13. A calibration method, used to calibrate mismatches between a first signal path and a second signal path of a receiver, wherein a delay chain is configured in the first signal path of the receiver to delay a signal transmitted through the first signal path, and a finite impulse response filter is configured in the second signal path of the receiver to compensate the mismatches between the first signal path and the second signal path, the calibration method comprising:

inputting a multiple-frequency signal to a first mixer in the first signal path and to a second mixer in the second signal path, and selecting from a cosine signal and a sine signal output from a local oscillator by a switching circuit, such that the sine signal output by the local oscillator is transmitted to the first mixer and the second mixer respectively for executing a frequency mixing with the multiple-frequency signal, so as to respectively generate a first frequency mixing signal corresponding to the first mixer and a second frequency mixing signal corresponding to the second mixer;

respectively inputting the first frequency mixing signal and the second frequency mixing signal to a low-pass filter in the first signal path and a low-pass filter in the second signal path, and respectively inputting an output of the low-pass filter in the first signal path and an output of the low-pass filter in the second signal path to an analog-to-digital converter in the first signal path and an analog-to-digital converter in the second signal path, to generate a first test signal corresponding to the first signal path and a second test signal corresponding to the second signal path;

respectively inputting the first test signal and the second test signal to the delay chain and the finite impulse response filter to generate a delay signal and a compensated output signal; and executing a subtraction operation between the delay signal and the compensated output signal to obtain a first calibration coefficient related to the finite impulse response filter in the second signal path, and calibrating a plurality of tap coefficients of the finite impulse response filter by the first calibration coefficient, such that the calibrated finite impulse response filter in the second signal path compensates the mismatches between the first signal path and the second signal path.

14. The calibration method according to claim 13, wherein a first terminal of the switching circuit is electrically connected to the first mixer, a second terminal and a third terminal of the switching circuit is electrically connected to the local oscillator respectively, and the second terminal and the third terminal of the switching circuit respectively receive the cosine signal and the sine signal output by the local oscillator, wherein the switching circuit is controlled by a switch control signal to selectively connect the first terminal of the switching circuit to the second terminal or to the third terminal of the switching circuit.

15. The calibration method according to claim 13, wherein one of the first signal path and the second signal path is an in-phase signal path and the other one is a quadrature signal path.

16. A calibration circuit, used to calibrate mismatches between a first signal path and a second signal path of a receiver, wherein a delay chain is configured in the first signal path of the receiver to delay a signal transmitted through the first signal path, and a finite impulse response filter is configured in the second signal path of the receiver to compensate the mismatches between the first signal path and the second signal path, the calibration circuit comprising:

a frequency mixing signal generating unit, inputting a multiple-frequency signal to a first mixer in the first signal path and to a second mixer in the second signal path, and utilizing a switching circuit to select from a cosine signal and a sine signal output from a local oscillator , such that the sine signal output from the local oscillator is transmitted respectively to the first mixer and the second mixer for executing a frequency mixing with the multiple-frequency signal, so as to generate a first frequency mixing signal corresponding to the first mixer and a second frequency mixing signal corresponding to the second mixer;

a test signal generating unit, respectively inputting the first frequency mixing signal and the second frequency mixing signal to a low-pass filter in the first signal path and a low-pass filter in the second signal path, and respectively inputting an output of the low-pass filter in the first signal path and an output of the low-pass filter in the second signal path to an analog-to-digital converter in the first signal path and an analog-to-digital converter in the second signal path, to generate a first test signal corresponding to the first signal path and a second test signal corresponding to the second signal path; and a calibration unit, respectively inputting the first test signal and the second test signal to the delay chain and the finite impulse response filter to generate a delay signal and a compensated output signal, executing a subtraction operation between the delay signal and the compensated output signal to obtain a first calibration coefficient related to the finite impulse response filter in the second signal path, and calibrating a plurality of tap coefficients of the finite impulse response filter by the first calibration coefficient, such that the calibrated finite impulse response filter in the second signal path compensates the mismatches between the first signal path and the second signal path.

17. The calibration circuit according to claim 16, wherein a first terminal of the switching circuit is electrically connected to the first mixer, a second terminal and a third terminal of the switching circuit are electrically connected to the local oscillator respectively, and the second terminal and the third terminal of the switching circuit respectively receive the cosine signal and the sine signal output from the local oscillator, wherein the switching circuit is controlled by a switch control signal to selectively connect the first terminal of the switching circuit to the second terminal or to the third terminal of the switching circuit.

18. The calibration circuit according to claim 16, wherein one of the first signal path and the second signal path is an in-phase signal path and the other one is a quadrature signal path.

* * * * *